US006525138B2

(12) United States Patent
Johoji et al.

(10) Patent No.: US 6,525,138 B2
(45) Date of Patent: Feb. 25, 2003

(54) THERMOPLASTIC RESIN COMPOSITION

(75) Inventors: Hirofumi Johoji, Ichihara (JP);
Hidetake Hozumi, Ichihara (JP);
Tadaaki Nishiyama, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/915,560

(22) Filed: Jul. 27, 2001

(65) Prior Publication Data
US 2002/0055592 A1 May 9, 2002

(30) Foreign Application Priority Data

Sep. 8, 2000  (JP) ......................................... 2000-272869

(51) Int. Cl.[7] .............................. C08F 8/00; C08L 23/00; C08L 23/04
(52) U.S. Cl. ....................................... 525/191; 525/240
(58) Field of Search ................................. 525/191, 240

(56) References Cited
U.S. PATENT DOCUMENTS 6,084,048 A  *  7/2000  Hozumi et al. ............. 502/103

FOREIGN PATENT DOCUMENTS

| DE | 199 05 292 A | 10/1999 |
| EP | 0 580 069 A | 1/1994 |
| EP | 0 739 940 A | 10/1996 |
| EP | 0 994 152 A | 4/2000 |
| EP | 1 031 584 A | 8/2000 |
| JP | 2001192490 A | 7/2001 |

* cited by examiner

Primary Examiner—Nathan M. Nutter
(74) Attorney, Agent, or Firm—Sughrue Mion, PLLC

(57) ABSTRACT

There is disclosed a thermoplastic resin composition comprising;
(A) 5 to 95% by weight of a thermoplastic resin having a melt flow rate of from 0.001 to 100 g/10 min. and a die swell ratio of not less than 1.7, and
(B) 95 to 5% by weight of an olefin polymer satisfying the following formula (1), $$Ua \leq 1.5 \times Sa \times (Ta/100)^{3.3} \tag{1}$$

wherein (i) Ua is a flexural modulus of a resin opposition for evaluation composed of 50 parts by weight of said olefin polymer and 50 parts by weight of a specific homopolypropylene resin, (ii) Sa is a flexural modulus of said homopolypropylene resin, and (iii) Ta is a containing ratio of said homopolypropylene resin in the resin composition for evaluation, provided that the sum of the component (A) and the component (B) is 100% by weight.

7 Claims, No Drawings

THERMOPLASTIC RESIN COMPOSITION

FIELD OF THE INVENTION

The present invention relates to a thermoplastic resin composition superior in flexibility, heat resistance and moldability (processability).

BACKGROUND OF THE INVENTION

A thermoplastic elastomer comprising EPOM and a thermoplastic resin is extensively used as a recyclable olefin elastomer.

However, in producing said thermoplastic elastomer, a step of cross-linking EPDM contained in the thermoplastic elastomer is required from a viewpoint of performances of the obtained thermoplastic elastomer such as flexibility, processability, handling facility and recyclability. As a result, there are left problems in that (1) production steps are troublesome, (2) a production cost is high, (3) an odor is generated in the cross-linking step, and (4) the product is easily contaminated with foreign matters caused by the cross-linking.

An object of the present invention is to provide a thermoplastic resin composition, which can be produced without such a cross-linking step, and is superior in flexibility, heat resistance and recyclability and also in moldability such as extrusion moldability, calendering moldability, blow moldability, foaming moldability, injection moldability and inflation moldability.

The present inventors have found a fact that a combination of a specific thermoplastic resin and a specific olefin (co)polymer can give a thermoplastic resin composition capable of attaining the above-mentioned object, and thereby the present invention has been obtained.

SUMMARY OF THE INVENTION

The present invention provides a thermoplastic resin composition comprising:

(A) 5 to 95% by weight of a thermoplastic resin having a melt flow rate of from 0.001 to 100 g/10 min. measured at a temperature of 230° C., under a load of 2.16 kg and a die swell ratio of not less than 1.7, and (B) 95 to 5% by weight of an olefin polymer satisfying the following formula (1), $$Ua \leq 1.5 \times Sa \times (Ta/100)^{3.3} \quad (1)$$

wherein:
(i) Ua is a flexural modulus (MPa) of a resin composition for evaluation measured according to JISK7203, which composition is composed of 50 parts by weight of said olefin polymer and 50 parts by weight of a homopolypropylene resin having a flexural modulus (Sa) of 1400±100 MPa measured according to JIS K7203, a melt flow rate of 12±3 g/10 min. measured at a temperature of 230° C. under a load of 2.16 kg and a peak position (melting point) on crystal melting of 162±2° C. measured by a differential scanning calorimeter (DSC) according to JIS R7122,
(ii) Sa is a flexural modulus (MPa) of said homopolypropylene resin measured according to JIS K7203, and
(iii) Ta is a containing ratio (50% by weight) of said homopolypropylene resin in the resin composition for evaluation, provided that the sum of the component (A) and the component (B) is 100% by weight.

DETAILED DESCRIPTION OF THE INVENTION

A melt flow rate of the component (A), a thermoplastic resin, used for the production of the thermoplastic resin composition in accordance with the present invention is from 0.001 to 100 g/10 min., preferably from 0.01 to 50 g/10 min., more preferably from 0.1 to 20 g/10 min., measured according to JIS K7210. When the melt flow rate exceeds 100 g/10 min., an extrusion molded article produced from the resulting thermoplastic resin composition is deformed according to the lapse of time after molding (that is, results in an inferior shape retaining property). When the melt flow rate is less than 0.001 g/10 min., an extrusion molded article produced from the resulting thermoplastic resin composition becomes inferior in surface smoothness.

A die swell ratio of the component (A) is not less than 1.7, preferably not less than 1.8, more preferably not less than 2.0. When the die swell ratio is less than 1.7, an extrusion molded article produced from the resulting thermoplastic resin composition becomes interior in shape retaining property. How to measure the die swell ratio is as described below.

The component (A) may be a known thermoplastic resin. Examples of the component (A) are polyethylene resins such as high density polyethylene, medium density polyethylene, low density polyethylene and linear low density polyethylene (LLDPE); copolymer resins with ethylene such as ethylene-vinyl acetate copolymer resin, ethylene-methyl methacrylate copolymer resin, ethylene-methacrylate resin copolymer resin, ethylene-acrylate copolymer resin, ethylene-methacrylic acid copolymer resin, ethylene-acrylic acid copolymer resin and ethylene-styrene copolymer resin; polypropyrene resins; polybutene resins; poly-4-methyl-pentene-1 resins; polystyrene resins; polyester resins polyamide resins; polyphenylene ether resins; polyacetal resins; polycarbonate resins; cyclic olefin homopolymer resins and cyclic olefin copolymer resins. Of these, polyolefin resins such as polyethylene resins, copolymer resins with ethylene, polypropylene resins, polybutene resins, and poly-4-methyl-pentene-1 resins are preferred. More preferred are polyolefin resins mainly containing an aliphatic olefin having not less than 2 carbon atoms, and much more preferred are those containing mainly an aliphatic olefin having not less than 3 carbon atoms. Polypropylene resins are particularly preferred.

Examples of the above-mentioned aliphatic olefin having not less than 2 carbon atoms are ethylene, propylene, butene-1, pentene-1, hexene-1, heptene-1, octene-1 and 4-methyl-pentene-1. From an industrial point of view, an aliphatic olefin having 2 to 8 carbon atoms is preferred. A content of a structural unit derived from the aliphatic olefin having not less than 2 carbon atoms in the component (A) (such a structural unit being hereinafter referred to as "aliphatic olefin unit of not less than 2 carbon atoms") is preferably not less than 60% by weight, more preferably not less than 70% by weight, much more preferably not less than 80% by weight. When the content is less than 60% by weight, it may happen that the resulting thermoplastic resin composition becomes inferior in its heat resistance.

The "polypropylene resin" means a propylene homopolymer resin and a copolymer resin of propylene and at least one olefin selected from ethylene and olefins having 4 to 12 carbon atoms, which copolymer resin has a propylene unit content of from 60 (inclusive) to 100(exclusive)% by weight in the resin.

As the polypropylene resin, a crystalline polypropylene resin having mainly an isotactic or syndiotactic sequence structure is examplified. As the above-mentioned copolymer resin, a random copolymer resin and a block copolymer resin obtainable by multi-stage polymerization are exemplified. A number average molecular weight of the polypropylene resin is not particularly limited, and preferably from 10,000 to 1,000,000.

As an index of the crystallinity of the polypropylene resin, a melting point and a calorie for crystal melting are exemplified. The melting point is preferably from 80 to 176° C., more preferably from 120 to 176° C. The calorie for crystal melting is preferably from 30 to 120 J/g, more preferably from 60 to 120 J/g. When the melting point and the melting calorie are too low, it may happen that the resulting thermoplastic resin composition deteriorates in its heat resistance.

A general process for producing the polypropylene resin includes, for example, a process wherein propylene alone or a combination of propylene and at least one olefin selected from ethylene and olefins having 4 to 12 carbon atoms is subjected to polymerization in the presence of a polymerization catalyst, thereby obtaining the propylene homopolymer or its copolymer. As the polymerization catalyst, (1) a Ziegla-Natta catalyst comprising a combination of a titanium-containing solid transition metal component and an organometal component, (ii) a catalyst comprising a compound of a transition metal belonging to the 4 to 6 groups of the periodic table as an essential ingredient, and (iii) a metallocene catalyst comprising at least one cyclopentadienyl group-carrying compound of a transition metal belonging to the 4 to 6 groups of the periodic table as an essential ingredient are exemplified. The polymerization can be carried out by, for example, slurry polymerization, gas phase polymerization, bulk polymerization, solution polymerization and a combination thereof. It is permitted to carry out the polymerization in a manner of a single stage polymerization or multi-stage polymerization combining optional two or more of these polymerization methods. As the polypropylene resin, a commercially available polypropylene resin may be used.

As the polypropylene resin of the component (A), those described in JP-A 11-228629, JP-A 7-138430 and WO99/16797 are exemplified.

The component (B) used for the production of the thermoplastic resin composition in accordance with the present invention is an olefin resin satisfying the above-mentioned formula (1), preferably the following formula (2), more preferably the following formula (3), much more preferably the following formula (4). When the component (B) does not satisfy the above formula (1), the resulting thermoplastic resin composition deteriorates in its flexibility.

$$Ua \leq 1.4 \times Sa \times (Ta/100)^{3.3} \quad (2)$$

$$Ua \leq 1.3 \times Sa \times (Ta/100)^{3.3} \quad (3)$$

$$Ua \leq 1.2 \times Sa \times (Ta/100)^{3.3} \quad (4)$$

Whether or not a certain olefin polymer satisfies the above formulae (1) to (4) is determined by a method comprising the following steps (1) to (8).

(1) As the homopolypropylene resin, a propylene homopolymer having a flexural modulus (Sa) of 1400±100 MPa measured according to JIS K7203, a melt flow rate of 12±3 g/10 min. measured at a temperature of 230° C. under a load of 2.16 kg. and a peak position (melting point) on crystal melting of 162±2° C. measured by a differential scanning calorimeter (DSC) according to JIS K7122 is used. It is permitted to use a commercially available one as the homopolypropylene resin.

(2) A flexural modulus (Sa) of the homopolypropylene is measured according to JIS K7203.

(3) A mixture of 50 parts by weight of said homopolypropylene, 50 parts by weight (Ta) of the olefin polymer and 0.25 part by weight of an antioxidant, a trademark of Irganox 1010, manufactured by Ciba Specialty Chemicals, K.K., is kneaded at 200° C. for 2 minutes at a screw revolution of 10 rpm in a batch type closed kneading machine (for example, a kneader such as a trademark of Plasti-Corder PLV151 Type, manufactured by Brabender OHG), followed by successive kneading at 100 rpm for minutes, thereby obtaining a resin composition (1) for evaluation use.

(4) The above resin composition (1) for evaluation use is subjected to press molding at 230° C. according to JIS K6758, thereby obtaining test pieces.

(5) A flexural modulus (Ua) of said test piece is measured according to JIS K7203.

(6) The above Sa value and Ta value (50 parts by weight) are substituted for Sa and Ta of respective right sides of the above formulae (1) to (4) to find respective values of the right sides.

(7) The obtained value of the right side is compared with the above Ua to know whether or not the resin composition (1) for evaluation use satisfies any of the formulae (1) to (4).

(8) When the resin composition (1) for evaluation use satisfies the formula (1), said olefin polymer is to be applicable to the component (B) used in the present invention.

When a resin composition (2) for evaluation use, which is obtained by kneading 30 parts by weight of the above defined homopolypropylene resin, 70 parts (Ta) by weight of a certain olefin polymer and 0.25 part of the above-mentioned antioxidant in a manner similar to that of the above-mentioned step (3), satisfies the above formula (1), such an olefin polymer is a preferred component (B).

When a resin composition (3) for evaluation use, which is obtained by kneading 70 parts by weight of the above defined homopolypropylene resin, 30 parts (Ta) by weight of a certain olefin polymer and 0.25 part of the above-mentioned antioxidant in a manner similar to that of the above-mentioned step (3), satisfies the above formula (1), such an olefin polymer is a more preferred component (B).

As the component (B), preferred is a non-crystal line olefin polymer showing neither a peak of not less than 1 J/g on crystal melting nor a peak of not less than 1 J/g on crystallization, when measured with a differential scanning calorimeter (DSC) according to JIS X7122. When the olefin polymer shows such a peak, it may happen that the resulting thermoplastic resin composition deteriorates in its flexibility and heat resistance. As the differential scanning calorimeter, DSC 220C manufactured by Seiko Instruments Inc. is exemplified, and the measurement is carried out at a temperature-raising and temperature-descending rates of each 10° C./min.

A molecular weight distribution (Mw/Mn) of the component (B) measured by gel permeation chromatography (GPC) is preferably not more than 5, more preferably not more than 4, much more preferably not more than 3. When the molecular weight distribution exceeds 5, it may happen that the resulting thermoplastic resin composition deteriorates in its flexibility. In general, when a molecular weight distribution of an olefin polymer, particularly an olefin polymer produced according to one vessel polymerization (one stage polymerization), is broad, its inter-molecular composition distribution becomes broad, and when such an olefin polymer is used, it may happen that the resulting thermoplastic resin composition deteriorates in its surface appearance according to the lapse of time after molding.

The molecular weight distribution can be measured by gel permeation chromatography (GPC) using an apparatus such as 150C/GPC manufactured by Waters Co. An elusion temperature is 140° C., and a column such as Shodex racked Column A-80M manufactured by Showa Denko K.K., and a molecular weight standard substance such as polystyrene of molecular weight of 68~8,400,000 manufactured by Tosoh Corporation are used. The molecular weight distribution is expressed by a ratio (Mw/Mn) of both, the obtained weight average molecular weight Mw and number average molecular weight Mn in terms of polystyrene. As a sample for the GPC measurement use, a solution obtained by dissolving about 5 mg of the component (B) in 5 ml of o-dichlorobenzene (concentration of about 1 mg/ml) is used. 400 Micro-litters of said solution is injected, a flow rate of eluded solution is controlled to 1.0 ml/min., and detection is carried out using a refractive index detector.

An intrinsic viscosity $[\beta]$ (135° C. tetralin solvent) of the component (B) is preferably from 0.3 to 10.0, more preferably from 0.5 to 7.0, much more preferably from 0.7 to 5.0. When the intrinsic viscosity is less than 0.3, it may happen that the resulting thermoplastic resin composition deteriorates in its tensile strength at break. When the intrinsic viscosity exceeds 10.0, it may happen that the resulting thermoplastic resin deteriorates in its processability.

The intrinsic viscosity is measured using Ubbellohde viscometer. As a solution used for the measurement of intrinsic viscosity, a solution prepared by dissolving 300 mg of the component (B) in 100 ml of tetralin (concentration of 3 mg/ml), and ½-, ⅓- and ⅕-time dilute solutions thereof are used. Respective viscosity of these solutions are measured three times in a thermostat of 135° C. (±0.1° C.), and an average of the values obtained is used.

A preferred component (B) is an olefin polymer obtained by subjecting a combination of ethylene and an α-olefin having 3 to 20 carbon atoms, and, if desired, at least one monomer selected from the group consisting of polyene compounds, cyclic olefins and vinyl aromatic compounds to copolymerization. As the comonomer copolymerizable with ethylene, for example, the following comonomers are enumerated.

1. α-Olefin Having 3 to 20 Carbon Atoms

As such an α-olefin, linear and branched α-olefins are exemplified. Specific examples of the linear α-olefin are propylene, 1-butene, 1-pentene, 1-hexene, 1-heptene, 1-octene, 1-nonene, 1-decene, 1-undecene, 1-dodecene, 1-tridocene, 1-tetradecene, 1-pentadecene, 1-hexadecene, 1-heptadecene, 1-octadecene, 1-nanodecene and 1-eicocene. Specific examples of the branched α-olefin are 3-methyl-1-butene, 3-methyl-1-pentene, 4-methyl-1-pentene, 2-ethyl-1-hexene and 2,2,4-trimethyl-1-pentene. Of these, linear propylene, 1-butene, 1-pentene, 1-hexene, 1-octene and 1-decene are preferred.

2. Polyene Compound

As the polyene compound, both a conjugated polyene compound and a non-conjugated polyene compound are preferred. The polyene compound includes, for example, an aliphatic conjugated polyene compound and an alicyclic conjugated polyene compound. As the aliphatic conjugated polyene compound, a linear aliphatic conjugated polyene compound and a branched aliphatic conjugated polyene compound are exemplified. The aliphatic conjugated polyene compound and the alicyclic conjugated polyene compound may contain a group such as an alkoxy group, an aryl group, an aryloxy group, an aralkyl group and an aralkyloxy group.

Specific examples of the aliphatic conjugated polyene compound are 1,3-butadiene, isoprene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-chloro-1,3-butadiene, 2,3-dichloro-1,3-butadiene, 1-fluoro-1,3-butadiene, 2-chloro-1,3-pentadiene, 2-methyl-1,3-pentadiene. 2-methyl-1,3-hexadiene, 2-methyl-1,3-octadiene, 25 2-methyl-1,3-decadiene, 2,3-dimethyl-1,3-pentadiene. 2,3-dimethyl-1,3-hexadiene, 2,3-dimethyl-1,3-octadiene and 2,3-dimethyl-1,3-decadiene.

Specific examples of the alicyclic conjugated polyene compound are 2-methyl-1,3-cyclopentadiene. 2-mehtyl-1,3-cyclohexadiene, 2,3-dimethyl-1,3-cyclopentadiene, 2,3-dimethyl-1,3-cyclohexadiene, 2-chloro-1,3-cyclopentadiene and 2-chloro-1,3-cyclohexadiene.

The non-conjugated polyene compound includes, for example, an aliphatic non-conjugated polyene compound, an alicyclic non-conjugated polyene compound and an aromatic non-conjugated polyene compound. As the aliphatic non-conjugated polyene compound, a linear aliphatic non-conjugated polyene compound and a branched aliphatic non-conjugated polyene compound are exemplified. The aliphatic non-conjugated polyene compound, the alicyclic non-conjugated polyene compound and the aromatic non-conjugated polyene compound may contain a group such as an alkoxy group, an aryl group, an aryloxy group, an aralkyl group and an aralkyloxy group.

Specific examples of the aliphatic non-conjugated polyene compound are 1,4-hexadiene, 1,5-hexadiene, 1,6-heptadiene, 1,6-octadiene. 1,7-octadiene, 1,8-nonadiene, 1,9-decadine, 1,13-tetradecadiene, 1,5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene. 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethy-1,6-octadiene, 6-propyl-1,6-octadiene, 6-butyl-1,6-octadiene, 4-methyl-1,4-nonadiene. 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, 6,10-dimetnyl-1,5, 9-undecatriene, 5,9-dimethyl-1,4,8-decatriene, 4-ethylidene-8-methyl-1,7-nonadiene, 13-ethyl-9-methyl-1, 9,12-pentadecatriene, 5,9,13-trimethyl-1,4,8,12-tetradecadiene. 8,14,16-trimethyl-1,7,14-hexadecatriene and 4-ethylidene-12-methyl-1,11-pentadecadiene.

Specific examples of the alicyclic non-conjugated polyene compound are vinylcyclohexene, 5-vinyl-2-norbornene, 5-ethylidene-2-norbornene, 5-methylene-2-norbornene, 5-isopropenyl-2-norbornene, cyclohexadiene, dicyclopentadiene, cyclooctadiene, 2,5-norbornadiene, 2-methyl-2,5-norbornadiene, 2-ethyl-2,5-norbornadiene, 2,3-diisopropylidene-5-norbornene, 2-ethylidene-3-isopropylidene-5-norbornene, 6-chloromethyl-5-isopropenyl-2-norbornene, 1,4-divinylcyclohexane, 1,3-divinylcyclohexane, 1,3-divinylcyclopentane, 1,5-divinylcyclooctane, 1-allyl-4-vinylcyclohexane, 1.4-diallylcyclohexane, 1-allyl-5-vinylcyclooctane, 1,5-diallylcyclooctane, 1-allyl-4-isopropenylcyclohexane, 1-isopropenyl-4-vinylcyclohexane, 1-isopropenyl-3-vinylcyclopentane and methyltetrahydroindene.

Specific examples of the aromatic non-conjugated polyene compound are divinylbenzene and vinylisopropenylbenzene.

3. Cyclic Olefin Compound

Specific examples of the cyclic olefin compound are norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronapthalene, 2-methyl-1,4,5,8-dimethano-1,2,3,4,4a,5,8,8a-octahydronapthalene, 2-ethyl-1,4,5,8-dimethano-1,2,3,4,4a5,8,8a-octahydronapthalene, 2,3-dimethyl-1,4,5,8-dimethano-1,2,3,4,4a,5,8,8a-octahydronapthalene, 2-hexyl-1,4,5,8-dimethano-1,2,3,4,4a,5,8,8a-octahydronapthalene, 2-ethylidene-1,4,5,8-dimethano-1,2,3,4,4a,5,8,8a-octahydronapthalene, 2-fluoro-1,4,5,8-dimethano-1,2,3,4,4a,5,8,8a-octahydronapthalene, 1,5-dimethyl-1,4,5.8-dimethano-1,2,3,4,4a,5,8,8a-octahydronapthalene, 2-cyclohexyl-1,4,5,8-dimethano-1,2,3,4,4a,5,8,8a-octahydronapthalene, 2,3-dichloro-1,4,5,8-dimethano-1,2,3,4.4a,5,8,8a-octahydronapthalene, 2-isobutyl-1,4,5,8-dimethano-1,2,3,4,4a,5,8,8a-octahydronapthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, 5-cyanonorbornene, cyclopentene, 3-methylcyclopentene, 4-methylcyclopentene, 3,4-dimethylcyclopentene, 3,5-dimethylcyclopenetene, 3-chlorocyclopentene, cyclohexene, 3-methylcyclohexene, 4-methylcyclohexene, 3,4-dimethylcyclohexene, 3-chlorocyclohexene and cycloheptene 4. Vinyl Aromatic Compound Specific examples of the vinyl aromatic compound are styrene, α-methylstyrene, p-methylstyrene, vinylxylene, monochlorostyrene, dichlorostyrene, monobromostyrene, dibromostyrene, fluorostyrene, p-tert-butylstyrene, ethylstyrene, vinylnaphthalene and divinylbenzene.

At an olefin polymer obtained from a combination of the above-mentioned monomers, the following polymers 1 to 19 are exemplified.

1. Olefin polymers obtained by copolymerizing ethylene and at least one α-olefin having 3 to 20 carbon atoms, and if desired, at least one compound selected from the group consisting of the polyene compounds, the cyclic olefin compounds and the vinyl aromatic compounds.

2. Olefin polymers obtained by copolymerizing ethylene and at least one α-olefin having 4 to 20 carbon atoms, and if desired, at least one compound selected from the group consisting of the polyene compounds, the cyclic olefin compounds and the vinyl aromatic compounds.

3. Olefin polymers obtained by copolymerizing ethylene, propylene and at least one α-olefin having 4 to 20 carbon atoms, and if desired, at least one compound selected from the group consisting of the polyene compounds, the cyclic olefin compounds and the vinyl aromatic compounds.

4. Olefin polymers obtained by copolymerizing propylene and at least one α-olefin having 4 to 20 carbon atoms, and if desired, at least one compound selected from the group consisting of the polyene compounds, the cyclic olefin compounds and the vinyl aromatic compounds.

5. Olefin polymers obtained by copolymerizing ethylene and at least one α-olefin having 4 to 20 carbon atoms.

6. Olefin polymers obtained by copolymerizing ethylene, at least one α-olefin having 4 to 20 carbon atoms, and at least one polyene compound.

7. Olefin polymers obtained by copolymerizing ethylene, at least one α-olefin having 4 to 20 carbon atoms, and at least one cyclic olefin compound.

8. Olefin polymers obtained by copolymerizing ethylene, at least one α-olefin having 4 to 20 carbon atoms, and at least one vinyl aromatic compound.

9. Olefin polymers obtained by copolymerizing ethylene, at least one α-olefin having 4 to 20 carbon atoms, at least one polyene compound, and at least one vinyl aromatic compound.

10. Olefin polymers obtained by copolymerizing ethylene, propylene, and at least one α-olefin having 4 to 20 carbon atoms.

11. Olefin polymers obtained by copolymerizing ethylene, propylene, at least one O-olefin having 4 to 20 carbon atoms, and at least one polyene compound.

12. Olefin polymers obtained by copolymerizing ethylene, propylene, at least one α-olefin having 4 to 20 carbon atoms, and at least one cyclic olefin compound.

13. Olefin polymers obtained by copolymerizing ethylene, propylene, at least one α-olefin having 4 to 20 carbon atoms, and at least one vinyl aromatic compound.

14. Olefin polymers obtained by copolymerizing ethylene, propylene, at least one α-olefin having 4 to 20 carbon atoms, at least one polyene compound, and at least one vinyl aromatic compound.

15. Olefin polymers obtained by copolymerizing propylene and at least one α-olefin having 4 to 20 carbon atoms.

16. Olefin polymers obtained by copolymerizing propylene, at least one α-olefin having 4 to 20 carbon atoms, and at least one polyene compound.

17. Olefin polymers obtained by copolymerizing propylene, at least one α-olefin having 4 to 20 carbon atoms and at least one cyclic olefin compound.

18. Olefin polymers obtained by copolymerizing propylene, at least one α-olefin having 4 to 20 carbon atoms, and at least one vinyl aromatic compound.

19. Olefin polymers obtained by copolymerizing propylene, at least one α-olefin having 4 to 20 carbon atoms, at least one polyene compound and at least one vinyl aromatic compound.

These olefin polymers can be produced using a known polymerization catalyst. A preferred polymerization catalyst is disclosed in, for example, JP-A 11-293047.

As the polymerization catalyst, (i) Ziegla-Natta catalysts, (ii) catalysts obtained using a compound of a transition metal belonging to the groups 4 to 6 of the periodic table, and (iii) metallocene catalysts obtained using at least one cyclopentadienyl skeleton-carrying compound of a transition metal belonging to the groups 4 to 6 of the periodic table are exemplified. From a viewpoint of uniformity of a composition distribution of the resulting olefin polymer, it is recommendable to use a single site catalyst such as metallocene catalysts.

The metallocene catalysts, one of the single site catalysts, are disclosed in known literature such as JP-A 58-19309, JP-A 60-35005, JP-A 60-35006, JP-A 60-35007, JP-A 60-35008, JP-A 61-130314, JP-A 3-163088, JP-A 4-268307, JP-A 9-12790, JP-A 9-87313, JP-A 10-508055, JP-A 11-80233 and JP-W 10-508055 (publication of PCT application).

Non-metallocene catalysts, one of the single site catalysts, are disclosed in known literature such as JP-A 10-316710, JP-A 11-100394, JP-A 11-80228, JP-A 11-80227, JP-W 10-513489 (publication of PCT application), JP-A 10-338706 and JP-A 11-71420.

Among the catalysts mentioned above, the metallocene catalysts are generally used. A preferred metallocene catalyst includes, for example, a complex of a transition metal belonging to the 3 to 12 groups of the periodic table, which has at least one cyclopentadiene type anion skeleton, and which has a $C_1$ symmetric structure from a viewpoint of flexibility of the resulting olefin polymer.

A preferred process for producing a high molecular weight olefin polymer using the metallocene catalyst includes, for example, a process for subjecting a combination of ethylene and an α-olefin having 3 to 20 carbon atoms, and if desired at least one monomer selected from the group consisting of polyene compounds, cyclic olefins and vinyl aromatic compounds to copolymerization in the presence of a catalyst which can be obtained using at least one transition metal complex (α) as mentioned below, at least one aluminum compound (β) as mentioned below and/or a boron compound (γ) mentioned below.

Transition Metal Complex (α)

Transition metal complexes represented by the following formula [I], [II] or [III].

Aluminum Compound (β)

An aluminum compound expressed by the following (β1). (β2) or (β3).

(⊕1): An organoaluminum compound represented by a formula, $E^1_a AlZ_{3-a}$.

(β2): A cyclic aluminoxane having a structure represented by a formula, $\{-Al(E^2)-O-\}_b$.

(β3): A linear aluminoxane having a structure represented by a formula, $\{-Al(E^3)-O-\}_c AlE^3_2$.

In the above, $E^1$, $E^2$ and $E^3$ are each a hydrocarbon group, all $E^1$, all $E^2$ and all $E^3$ are the same or different, Z is a hydrogen atom or a halogen atom, and all Z are the same or different, a is a number satisfying 0<a≦3, b is an integer of not less than 2, and C is an integer of not less than 1.

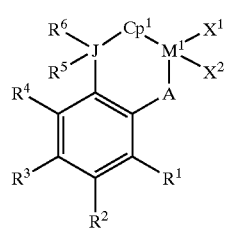
[I]

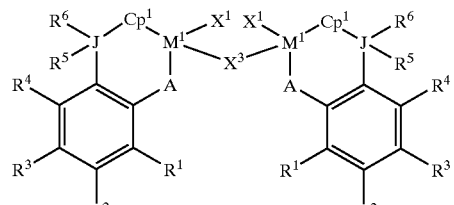
[II]

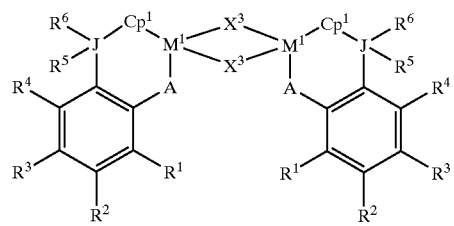
[III]

In the above formulae [I] to [III], $M^1$ is a transition metal atom belonging to the group 4 of the periodic table, A is an atom belonging to the group 16 of he periodic table, J is an atom belonging to the group 14 of the periodic table, $Cp^1$ is a group having a cyclopentadiene type anion skeleton, $X^1$, $X^2$, $R^1$, $R^2$, $R^3$, $R^4$, $R^5$ and $R^6$ are independently of one another a hydrogen atom, a halogen atom, an alkyl group, an aralkyl group, an aryl group, a substituted silyl group, an alkoxy group, an aralkyloxy group, an aryloxy group or a di-substituted amino group, and $X^3$ is an atom belonging to the group 16 of the periodic table, provided that $R^1$, $R^2$, $R^3$, $R^4$, $R^5$ and $R^6$ may be optionally combined to form a ring, and two of $M^1$, A, J, $Cp^1$, $X^1$, $X^2$, $R^1$, $R^2$, $R^3$, $R^4$, $R^5$ and $R^6$ are the same or different.

Boron Compound (γ)

Boron compounds expressed by the following (γ1) (γ2) or (γ3).

(γ1): A boron compound represented by a formula, $BQ^1Q^2Q^3$.

(γ2) A boron compound represented by a formula, $G^+(BQ^1Q^2Q^3Q^4)^-$.

(γ3): A boron compound represented by a formula, $(L-H)^+(BQ^1Q^2Q^3Q^4)^-$.

In the above, B is a trivalent boron atom, $Q^1$ to $Q^4$ are each a halogen atom, a hydrocarbon group, a halogenated hydrocarbon group, a substituted silyl group, an alkoxy group or a di-substituted amino group and are the same or different, $G^+$ is an inorganic or organic cation, L is a neutral Lewis base, and $(L-H)^+$ is a Brønsted acid.

In the case where a catalyst obtained from a combination of tho component (α) and the component (β) among the components (α) to (γ) is used, it is recommendable to use the component (β2) and/or the component (β3) as the component (β). In the case where a catalyst obtained from a combination of the component (α), the component (β) and the component (γ) is used, it is recommendable to use at least one component selected from the above-mentioned components (β1) to (β3) as the component (β).

With respect to amounts to be used of the components (α) to (γ), a ratio of the component (β)/the component (α) is usually from 0.1 to 10,000, preferably from 5 to 2,000 in terms of a molar ratio, and a ratio of the component (γ)/the component (α) is usually from 0.01 to 100, preferably from 0.5 to 10 in terms of a molar ratio.

When the components (α) to (γ) are used in the form of a solution or a suspension, it is permitted to suitably select its concentration depending upon conditions such as performance of an apparatus used for supplying respective components to a polymerization reactor. A concentration of the component (α) is usually from 0.01 to 500 μmol/g, preferably from 0.05 to 100 μmol/g, more preferably from 0.05 to 50 μmol/g. A concentration of the component (β) in terms of Al atom is usually from 0.01 to 10,000 μmol/g, preferably from 0.1 to 5,000 μmol/g, more preferably from 0.1 to 2,000 μmol/g. A concentration of the component (γ) is usually from 0.01 to 500 μmol/g, preferably from 0.05 to 200 μmol/g, more preferably from 0.05 to 100 μmol/g.

A polymerization process for obtaining the olefin polymer is not limited. As the polymerization process, a solution process and slurry process wherein a solvent is used, and a gas phase process wherein no solvent is used are exemplified. Examples of the solvent are aliphatic hydrocarbons such as butane, pentane, hexane, heptane and octane; aromatic hydrocarbons such as benzene and toluene; and halogenated hydrocarbons such as methylene dichloride. It is possible to carry out the polymerization in any of continuous or batch manner. A polymerization temperature is usually from −50 to 200° C., particularly preferably from −20 to 100° C. A polymerization pressure is preferably from atmospheric pressure to 60 kg/cm²G. A polymerization time can be suitably determined depending upon the catalyst to be used and a reaction apparatus, and is usually from 1 minute to 20 hours. It is permitted to use a chain transfer agent such as hydrogen to regulate a molecular weight of the olefin polymer to be obtained.

A preferred component (B) is a polymer, which is obtained by copolymerizing at least two olefins selected from the group consisting of ethylene, propylene and α-olefins having 4 to 20 carbon atoms with the proviso that a total carbon number of the selected olefins is not less than 6, and which satisfies the following formula (5). A more preferred component (B) is a polymer satisfying the following formula (6), and a much more preferred component (B) is a polymer satisfying the following formula (7).

$$[y/(x+y)] \geq 0.30 \tag{5}$$

$$[y/(x+Y)] \geq 0.35 \tag{6}$$

$$[y/(x+Y)] \geq 0.40 \tag{7}$$

In the formulae, x is an ethylene unit content (mol %) in the component (B), and y is a $C_4$ to $C_{20}$ α-olefin unit content (mol %) in the component (B).

A proportion of the component (A) in the thermoplastic resin composition in accordance with the present invention is from 5 to 95 parts by weight, preferably from 10 to 90 parts by weight, more preferably from 20 to 80 parts by weight. A proportion of the component (B) is from 95 to 5 parts by weight, preferably from 90 to 10 parts by weight, more preferably from 80 to 20 parts by weight. When the component (A) exceeds 95 parts by weight, an article molded from the resulting thermoplastic resin composition deteriorates in its flexibility. When the component (A) is less than 5 parts by weight, an article molded from the resulting thermoplastic resin composition deteriorates in its strength, and an article extrusion molded from the resulting thermoplastic resin composition deteriorates in its shape retaining property and surface smoothness. When the component (B) exceeds 95 parts by weight, an article molded from the resulting thermoplastic resin composition deteriorates in its strength, and an article extrusion molded from the resulting thermoplastic resin composition deteriorates in its shape retaining property. When the component (B) is less than 5 parts by weight, an article molded from the resulting thermoplastic resin composition deteriorates in its flexibility.

The component (A) and the component (B) used in the present invention may be used in combination with a component (C) and/or a component (D) in an amount of from 0.1 to 200 parts by weight based on 100 parts by weight of the components (A) and (B), wherein the component (C) is a polymer comprising both the ethylene unit and the $C_3$ to $C_{20}$ α-olefin unit and satisfying the following formula (8), and the component (D) is anyone of a block copolymer (component D-1) composed of a polymer block comprising mainly a vinyl aromatic compound unit and another polymer block comprising mainly a conjugated diene compound unit, or a hydrogenated product (component D-2) of the component (D-1).

$$[y'/(x'+y')] < 0.30 \tag{8}$$

In the formula, x' is an ethylene unit content (mol %) in the component (C), and y' is a $C_4$ to $C_{20}$ α-olefin unit content (mol %) in the component (C).

Examples of the component (C) are those having a die swell ratio of less than 1,7, such as high density polyethylene, medium density polyetnylene, low density polyethylene, linear low densitypolyethylene (LLDPE), ethylene-vinyl acetate copolymer resin, ethylene-methyl methacrylate copolymer resin, ethylene-methacrylate copolymer resin, ethylene-acrylate copolymer resin, ethylene-methacrylic acid copolymer resin, ethylene-acrylic acid copolymer resin and ethylene-styrene copolymer resin. These resins may be used singly or in a mixture of two or more.

By using the component (C), the resulting thermoplastic resin composition can be improved in its tensile strength. When the proportion of the component (C) exceeds 200 parts by weight, it may happen that the resulting thermoplastic resin composition deteriorates in its heat resistance.

Examples of the vinyl aromatic compound related to the above-mentioned component (D-1) are styrene, α-methylstyrene, p-methylstyrene, vinylxylene, monochlorostyrene, dichlorostyrene, monobromostyrene, dibromostyrene, fuluorostyrene, p-tert-butylstyrene, ethylstyrene and vinylnaphthalene. These compounds may be used singly or in a mixture of two or more. Among these compounds, styrene is preferred.

A content of the vinyl aromatic compound unit in the polymer block comprising mainly the vinyl aromatic compound unit in the component (D-1) is preferably from 60 to 99% by weight. When the content is less than 60% by weight, it may happen that an article molded from the resulting thermoplastic alastomor composition deteriorates in its mechanical strength. When the content exceeds 99% by weight, it may happen that an article molded from the resulting thermoplastic elastomer composition deteriorates in its flexibility.

Examples of the conjugated diene compound related to the above-mentioned component (D-1) are 1,3-butadiene, isoprene, 2,3-dimethyl-1,3-butadiene, 2-neopentyl-1,3-butadiene, 2-chloro-1,3-butadiene, 2-cyano-1,3-butadiene, substituted linear conjugated pentadienes, linear conjugated hexadienes and side chain conjugated hexadienes. These compounds may be used singly or in a mixture of two or more. Among these compounds, 1,3-butadiene and isoprene are preferred.

A content of the conjugated diene compound unit in the polymer block comprising mainly the conjugated diene compound unit in the component (D-1) is preferably from 60 to 99% by weight. When the content is less than 60% by weight, it may happen that an article molded from the resulting thermoplastic elastomer composition deteriorates in its flexibility. When the content exceeds 99% by weight, it may happen that an article molded from the resulting thermoplastic elastomer composition deteriorates in its mechanical strength.

The component (D-1) can be represented by the following formulae (9) to (11).

| | |
|---|---|
| (H-S)n | (9) |
| (H-S)n-H | (10) |
| (H-S)n-X | (11) |

In the formulae, H is a polymer block comprising mainly a vinyl aromatic compound unit, S is a polymer block comprising mainly a conjugated diene compound unit, X is a residue of a coupling agent, and n is an integer of not less than 1.

A content ratio (weight ratio) between the polymer block comprising mainly a vinyl aromatic compound unit and the polymer block comprising mainly a conjugated diene compound unit is preferably from 2/98 to 50/50. When the ratio is less than 2/98, it may happen that an article molded from the resulting thermoplastic elastomer deteriorates in its modulus of elasticity. When the ratio exceeds 50/50, it may happen that an article molded from the resulting thermoplastic elastomer deteriorates in its flexibility.

A general process for producing the component represented by the above formula (9) includes, for example, a process wherein first of all the vinyl aromatic compound or the conjugated diene compound is polymerized using a polymerization initiator to produce the polymer block H or the polymer block S (step-1), respectively, and successively the conjugated diene compound or the vinyl aromatic compound is polymerized to produce the polymer block S or the polymer block H (step-2). The component having 2 or more as n can be produced by repeating respective steps 1 and 2 two times or more.

A general process for producing the component represented by the above formula (10) includes, for example, a process wherein first of all like above the polymer block H is produced (step-1), successively the polymer block S is produced (step-2), and further the polymer block H is produced (step-3). The component having 2 or more as n can be produced by repeating respective steps 1 and 2 two times or more.

The component represented by the above formula (11) can be obtained by allowing the block copolymer (H-S)n obtained in the production process of the component represented by the above formula (9) to reaction with a coupling agent.

Examples of the coupling agent are diethyl adipate, divinylbenzene, tetrachlorosilane, butyltrichlorosilane, tin tetrachloride, tin butyltrichloride, dimethyldichlorosilane, germanium tetrachloride, 1,2-dibromoethane, 1,4-chloromethylbenzene, bis(trichlorosilyl)ethane, epoxidized linseed oil, tolylenediisocyanate and 1,2,4-benzenetriisocyanate.

A process for producing the component (D-2) includes, for example, a process comprising dissolving the component (D-1) in an inert solvent and successively subjecting the solution to hydrogenation of the polymer block comprising mainly the conjugated diene compound unit in the component (D-1) under hydrogen pressure of form 1 to 100 kg/cm$^2$ at from 20 to 150° C. using a hydrogenating catalyst. A hydrogenation ratio can be determined by controlling conditions such as a hydrogenation catalyst, an amount of the component (D-1), a hydrogen pressure and a reaction time.

It is permitted to use a commercially available one as the component (D-1) and to use the component (D-1) and the component (D-2) each alone or in a mixture thereof.

By using the component (D), the resulting thermoplastic resin composition can be improved in its tensile strength. When the proportion of the component (D) exceeds 200 parts by weight, it may happen that the resulting thermoplastic resin composition deteriorates in its weather resistance.

Further, it is permitted to use the component (A) and the component (B) used in the present invention in combination with an elastomer component. Examples of the elastomer component are natural rubber, polybutadiene, liquid polybutadiene, polyacrylonitrile rubber, acrylonitrile-butadiene copolymer rubber, hydrogenated acrylonitrile-butadiene copolymer rubber, butyl rubber, chloroprene rubber, fluororubber, chlorosulfonated polyethylene, silicone rubber, urethane rubber, isobutylene-isoprene copolymer rubber, halogenated isobutylene-isoprene copolymer rubber, polyolefin based thermoplastic elastomers, polyurethane based thermoplastic elastomers, polyester based thermoplastic elastomers, polyamide based thermoplastic elastomers, 1,2-polybutadiene based thermoplastic elastomers, polyvinyl chloride based thermoplastic elastomers, transpolyisoprene based thermoplastic elastomers and chlorinated polyethylene based thermoplastic elastomers Still further, it is permitted to use the component (A) and the component (B) used in the present invention in combination with a stabilizer or an additive. Examples of the stabilizer are age resistors, antioxidants, antiozonants, ultraviolet absorbers and photo-stabilizers. Examples of the additive are antistatic agents, slip agents, internal stripping agents, coloring agents, dispersants, anti-blocking agents, lubricants and anti-fogging agents.

Additionally, it is permitted to use the component (A) and the component (B) used in the present invention in combination with a filling agent or a softening agent. Examples of the filling agent are glass fiber, carbon fiber, metal fiber, glass beads, asbestos, mica, calcium carbonate, potassium titanate whisker, talc, aramid fiber, barium sulfate, glass flakes and fluororesin. Examples of the softening agent are naphthene oil and mineral oil (for example, paraffin mineral oil).

Additionally, it is permitted to use the component (A) and the component (B) used in the present invention in combination with a flame retarder. Examples of the flame retarder are inorganic compounds such as antimony flame retaders, aluminum hydroxide, magnesium hydroxide, zinc borate, guaniaine flame retarders and zirconium flame retarders; phosphates and phosphorus compounds such as ammonium polyphosphate. ethylenebistris(2-cyanoethyl)phosphonium chloride, tris(tribromophenyl)phosphate, and tris(3-hydroxypropyl)phosphinoxide; chlorine-containing flame retarders such as chlorinated paraffin, chlorinated polyolefin and perchlorocyclopentadecane; and bromine containing flame retarders such as hexabromobenzene, n ethylene-bisdibromonorbornane-dicarboxyimide, ethylene-bistetrabromophthalimide, tetrabromobisphenol-A derivatives, tetrabromobisphenol S and tetrabromodipentaerythritol. These flame retarders may be used each alone or in a mixture of two or more.

Additionally, it is permitted to use the component (A) and the component (B) used in the present invention in combination with a foaming agent, and it is possible to produce a foamed article using the thus obtained thermoplastic resin composition. Examples of the foaming agent are inorganic foaming agents such as sodium bicarbonate, ammonium bicarbonate and ammonium carbonate; nitroso compounds such as N,N'-dinitrosopentamethylenetetramine; azo compounds such as azocarbonamide and azoisobutylonitrile; and sulfonylhydrazides such as benzenesulfonylhydrazine, p,p'-oxybis(benzenesulfonylhydrazide), toluenesulfonylhydrazide and toluenesulfonylhydrazide derivatives. It is permitted to use the foaming agent in combination with a foaming coagent such as salicylic acid, urea and urea derivatives Additionally, it is permitted to use the component (A) and the component (B) used in the present invention in combination with a high frequency processing coagent such as a polar polymer. As the high frequency processing coagent, a copolymer of ethylene and at least one comonomer is exemplified. Examples of such a comonomer are monocarboxylic acids such as acrylic acid, methacrylic acid, ethacrylic acid and crotonic acid; dicarboxylic acids such as maleic acid, fumaric acid, itaconic acid and citraconic acid; monoesters of said dicarboxylic acid; methacrylates such as methyl methacrylate; acrylates such as methyl acrylate and ethyl acrylate; vinyl esters of saturated carboxylic acids such as vinyl acetate and vinyl propionate; and ionomers of these acids or esters.

Additionally, it is permitted to use the component (A) and the component (B) used in the present invention in combination with other resin components. Examples of the other resin compositions are rosin resins, polyterpene resins, synthetic petroleum resins, cumaron resins, phenol resins, xylene resins, styrene resins and isoprene resins.

The above-mentioned rosin resins include, for example, natural rosin, polymerized rosin, partially hydrogenated rosin, completely hydrogenated rosin, esterified products of these rosin (such as glycerol esters, pentaerithritol esters, ethylene glycol esters and methyl esters), and rosin derivatives (such as disproportionation rosin, fumaric acid-modified rosin and lime-modified rosin). The above-mentioned polyterpene resins include, for example, cyclic terpene homopolymers such as α-pinene, β-pinene and dipentene; said cyclic terpene copolymers; copolymers of said cyclic terpene and phenol compounds such as phenol and bisphenol (for example, α-pinene-phenol resin, dipentene-phenol resin and terpene-bisphenol resin); and aromatic-modified terpene resins such as copolymers of said cyclic terpene and an aromatic monomer.

The above-mentioned synthetic petroleum resins include, for example, homopolymers and copolymers of $C_5$ fraction, $C_6$ to $C_{11}$ fractions and other olefin fractions of naphtha cracked oil; hydrogenated products of said homopolymers and copolymers, namely, aliphatic petroleum resins; aromatic petroleum resins; alicyclic petroleum resins; and aliphatic-alicyclic copolymer resins. The synthetic petroleum resins further include, for example, copolymer petroleum resins such as copolymers of the above naphtha cracked oil and the above terpene and hydrogenated products thereof.

Preferred examples of the $C_5$ fraction of the above-mentioned naphtha cracked oil are methylbutenes such as isoprene, cyclopentadiene, 1,3-pentadiene, 2-methyl-1-butene and 2-methyl-2-butene; pentenes such as 1-pentene and 2-pentene; and dicyclopentadiene. Preferred examples of the $C_6$ to $C_{11}$ fractions are methylstyrenes such as indene, styrene, o-vinyltoluene, m-vinyltoluene, p-vinyltoluene, α-methylstyrene and β-methylstyrene; methylindene; ethylindene; vinylzylene and propenylbenzene. Preferred examples of other olefin fractions are butene, hexene, heptene, octene, butadiene and octadiene.

The above-mentioned phenol resins include, for example, alkylphenol resins, alkylphenol-acetylene resins obtained by condenstion between an alkylphenol and acetylene and modified products of such resins. Incidentally, it is permitted to use either a novolak resin obtained by methylolation of phenol with an acid catalyst or a resol resin obtained by methylolation with an alkaline catalyst.

The above-mentioned xylene resins include, for example, xylene-formaldehyde resins obtained from m-xylene and formaldehyde and modified resins thereof obtained by reaction with a third component.

The above-mentioned styrene resins include, for example, lower molecular weight products of styrene, copolymer resins of α-methylstyrene and vinyltoluene and copolymer resins of styrene, acrilonitrile and indene.

The above-mentioned isoprene resins include, for example, dimers of isoprene, i.e. resins obtained by copolymerization of a $C_{10}$ alicyclic compound and a $C_{10}$ chain compound.

Among the above-mentioned various tackiness-imparting resins, the rosin resins, polyterpene resins and synthetic petroleum resins are preferred. Of these, those having an aliphatic structure and/or an alicyclic structure are more preferred from a viewpoint of transparency of an article molded from the resulting thermoplastic resin composition. Here, as particularly preferred tackiness-imparting resins having an aliphatic structure and/or an alicyclic structure, with respect to the rosin resins, partially hydrogenated rosin, completely hydrogenated rosin and derivative thereof; with respect to the polyterpene resins, homopolymers and copolymers of cyclic terpene; and with respect to the synthetic petroleum resins, aliphatic petroleum resins, alicyclic petroleum resins and copolymers of hydrogenated products of naphtha cracked oil and various terpene are exemplified. It is permitted to use these resin components each alone or in a mixture of two or more. It is permitted to use commercially available ones as these resin components.

The thermoplastic resin composition in accordance with the present invention can be subjected to cross-linking in a conventional manner. As the cross-linking, sulfur cross-linking, peroxide cross-linking, metal ion cross-linking, silane cross-linking, water cross-linking and resin cross-linking are exemplified.

The thermoplastic resin composition in accordance with the present invention can be produced by kneading the component (A) and the component (B) and any of the optional components using known apparatus such as a roll, Brabender mixer, Bambury mixer, a pressure kneader and a twin screw extruder. Although both a closed type and open type apparatuses can be used, it is recommendable to use a closed type apparatus capable of being purged with an inert gas. A kneading temperature is a temperature at which all the resin components are melted, and usually from 70 to 400° C. preferably from 100 to 300° C., more preferably from 150 to 270° C. A kneading time depends upon the kinds and amounts of the components to be used and a kind of the kneading apparatus. It is usually from about 0.5 to 60 minutes, preferably from 1 to 30 minutes, more preferably from 3 to 10minutes, when a kneading apparatus such as a kneader or Bambury mixer is used. The kneading can be carried out either in a one-stage kneading manner, wherein all the components are collectively kneaded, or in a multi-stage divided manner, wherein a part of the components to be used is kneaded, and thereafter the remainder is added thereto, followed by kneading together.

The thermoplastic resin composition in accordance with the present invention is particularly superior as a material for extrusion molding use such as a profile extrusion molding.

Further, the thermoplastic resin composition in accordance with the present invention is particularly superior as a material for calendering use. The calendering includes, for example, a sheeting process for continuous production of a flat sheet having a high thickness accuracy; a doubling process for continuous production of a laminate sheet of the same or different kind of thermoplastic elastomer compositions or thermoplastic resin compositions, which sheet has a high thickness accuracy and no pinhole; a topping process for continuous production of a complex by combining cloth with a sheet; a friction process wherein a thermoplastic elastomer composition is rubbed in cloth to improve adhesion; and a profiling process.

Still further, the thermoplastic resin composition in accordance with the present invention is particularly superior as a material for blow molding use. Besides a conventional blow molding, a sheet parison method, a cold parison method, a bottle pack method, an injection blow molding method and a stretching blow molding method are exemplified as the blow molding. In the blow molding, it is recommendable to use the thermoplastic resin composition in a form of a parison or sheet of not lower than 200° C. from a viewpoint of blow-up property and surface appearance. For the purpose of obtaining more preferable effects, it is permitted to use an inert gas such as nitrogen, carbon dioxide, helium, argon and neon in place of air when expanding the parison or sheet.

Furthermore, the thermoplastic resin composition in accordance with the present invention is particularly superior as a material for foaming use. As the foaming, injection molding, extrusion molding and injection blow molding are exemplified. Molded articles expanded and extruded according to the extrusion molding can be passed through a cooling mandrel, and as a result, molded articles such as expanded tube, plate or stick like articles having a large thickness can be produced with a high dimension accuracy.

Additionally, the thermoplastic resin composition in accordance with the present invention is particularly superior as a material for stretch molding use. As the stretch molding, uniaxial stretching, biaxial stretching, successive biaxial stretching and simultaneous biaxial stretching are exemplified. The resulting molded article may be any of a single layer or a laminate of two or more layers.

The thermoplastic resin composition in accordance with the present invention can be applied for various uses such as parts for vehicles, parts for electric and electronic instruments. electric wires, building materials, goods for agriculture, marine product and gardening uses, goods for chemical industry use, public works materials, industry and manufacture materials, furniture, writing materials, daily necessaries, miscellaneous goods, clothes, goods for vessel and package use, toys, goods for leisure use and goods for medical use.

Examples of the parts for vehicles are car interior facings such as instrumental panels, doors, pillars and air bag covers; car exterior parts such as over fenders, clouding panels, roof rails and sidemoldings; and bicycle parts.

Examples of the parts for electric and electronic instruments are electric parts, electronic parts, light electric parts, materials for household appliances, goods for refrigerator use, lighting instruments and various covers for electric use.

Examples of the electric wires are plastic cables, insulated wires and materials for protecting electric wires.

Examples of building materials are materials for wall and ceiling uses such as ribs, baseboards, panels and tarpaulins; materials for roofing use such as corrugated boards, troughs and roof backing materials; materials for flooring use such as sill materials and tiles; materials for waterproof use such as jointing, jointing sticks and waterproof sheets; materials for equipment and apparatus uses such as ducts, cable ducts, prefabrication materials and purifiers; materials for structuring and furnishing uses such as building edges, building gaskets, weights of carpet, angles and louvers; and materials for industrial uses such as joiners and curing sheets.

Examples of the goods for agriculture, marine product and gardening uses are housing materials for agriculture.

Examples of the industry and manufacture materials are machine covers, machine parts, packing, gaskets, flanges, leather sailing cloths, bolts, nuts, bulbs and metal-protecting films.

Examples of furniture are cabinets, stools, sofas, mats. curtains and tablecloths.

Examples of the writing materials are card cases, cases for writing goods, accessories, key cases, cash card cases, stickers, labels, bookcovers, note covers, binders, pocketbooks, covers, files, cards, commutation tickets, desk pads, holders, magazine trays, albums, templates and grips of writing goods.

Examples of the daily necessaries and miscellaneous goods are bath covers, drainboards, buckets, dress covers, bedding cases, Western umbrellas, umbrella covers, reed screens, sewing requisites, shelf plates, brackets, picture frames, aprons, trays, tapes, ropes, belts and bags.

Examples of clothes are raincoats, mackintosh, rainwear sheets, children's leather coats, shoes, shoes covers, foot wears, gloves, ski wears, hats and sub-materials of hats.

Examples of goods for vessel and package uses are food containers, cloth packaging goods, packing and packaging materials, cosmetics bottles, cosmetics containers, medicine bottles, food bottles, bottles for physics and chemistry, detergent bottles, containers, caps, foodpacks, laminate films, shrunk films for industrial use and wrapping films for business use.

Examples of goods for medical use are a transfusion bag, a continuous portable peritoneal dialysis bag, a bag for storing blood.

With respect to application of extrusion molded articles, there are enumerated, for example, car interior or exterior parts, light electric parts such as packing and housing, parts for industrial use and waterproof sheet parts, for which a conventional soft vinyl chloride based resin has been applied.

As application taking advantage of characteristic features, namely, flexibility, superior extrusion processability and property freed from bleeding, there are enumerated, for example, hose such as air hose, water hose, reinforced air hose and reinforced water hose; tubes such as medical tubes; gaskets such as aluminum sash-sealing gaskets and car door gaskets; and packing such as packing of refrigerator door.

As mentioned above, according to the present invention, there can be provided a thermoplastic resin composition which is superior in flexibility, heat resistance and moldability (processability) such as extrusion moldability, calendering moldability, blow moldability, foaming moldability, injection moldability and stretch moldability, and which can be applied for various uses.

EXAMPLES

The present invention is explained with reference to Examples, which are not intended to limit the scope of the present invention.

Components used were as follows.
1. Component (A-1)
Polypropylene, a trademark of FH3400 manufactured by Chisso Corporation. Characteristics of the component (A-1) are as shown in Table 1.

2. Component (A-2)

Polypropylene, a trademark of F112400 manufactured by Chisso Corporation. Characteristics of the component (A-2) are as shown in Table 1.

3. Component (A-3)

Polypropylene, a trademark of PF814 manufactured by Montell Polyolefins Co. Characteristics of the component (A-3) are as shown in Table 1.

4. Component (A-4)

Polypropylene, a trademark of NOBLEN EL80F1 manufactured by Sumitomo Chemical Co., Ltd. Characteristics of the component (A-4) are as shown in Table 1.

5. PP

Homopolypropylene resin, a trademark of NOBLEN Y101 manufactured by Sumitomo Chemical Co., Ltd. Characteristics of PP are as shown in Table 2. Using PP, a resin composition for evaluation use was prepared.

6. Component (B-1)

A production process of the component (B-1) and characteristics thereof are described in Reference Example 1 and Table 3, respectively. The Ta value, Ua value and value of the right side of the above formula (1) are those of a resin composition for evaluation use, which is composed of 50 parts by weight of the component (B-1), 50 parts by weight of the above homopolypropylene resin (PP) and 0.25 part by weight of the antioxidant mentioned below.

7. Component (B-2)

A production process of the component (B-2) and characteristics thereof are described in Reference Example 2 and Table 3, respectively. The Ta value, Ua value and value of the right side of the above formula (1) are those of a resin composition for evaluation use, which is composed of 50 parts by weight of the component (B-2), 50 parts by weight of the above homopolypropylene resin (PP) and 0.25 part by weight of the antioxidant mentioned below.

8. EP

Ethylene-propylene copolymer having a propylene unit content of 53% by weight, a density of 0.860 g/cm$^3$, and MFR under 2.16 kg load at 190° C. of 0.6.

Ua value of a resin composition for evaluation use composed of 50 parts by weight of EP and 50 parts by weight (Ta) of a homopolypropylene resin having Sa value of 1380 MPa was found to be 384 MPa. Ua value calculated by substituting both Sa=1380 MPa and Ta=50 parts by weight for the right side of the above formula (1) was found to be 210 MPa.

9. Component (C-1)

Ethylene-butene-1 copolymer having a butene-1 unit content of 17% by weight, a density of 0.885 g/cm$^3$, and MFR under 2.16 kg load at 190° C. of 0.6.

10. Antioxidant

Antioxidant, a trademark of IRGANOX 1010 manufactured by Ciba Specialty chemicals K.K.

Physical properties were evaluated as follows.

1. Melt Flow Rate (MFR)

Melt flow rate at 230° C. was measured under a load of 2.16 kg according to JIS K7210.

2. Die Swell Ratio

A sample was subjected to extrusion under conditions of a barrel temperature of 190° C., a capillary diameter of 1 mm, a capillary length of 10 mm and a shear rate of 122 sec$^{-1}$ according to JIS K7199, and the die swell ratio was calculated by using "diameter of extrudate/diameter of capillary".

3. Melting Point of Crystal (° C.), Calorie for Crystal Melting (mj/mg), Crystallization Temperature (° C.) and Crystallization Calorie (mj/mg)

Measured at a temperature-raising rate and a temperature-descending rate of each 10° C./min. using a differential scanning calorimeter (DSC 220C Type) manufactured by Seiko Instruments Inc.

4. Molecular Weight Distribution (Mw/Mn)

About 5 mg of a sample was dissolved in 5 ml of o-dichlorobenzene to obtain a solution having a concentration of about 1 mg/ml, 400 μl of said solution was injected into a GPC apparatus, and a weight average molecular weight (Mw) and a number average molecular weight (Mn) of the sample were measured to know a molecular weight distribution (Mw/Mn) under conditions of an elusion temperature of 140° C. and a flow rate of eluded solution of 1.0 ml/min.

Here, as the GPC apparatus, 150C Type manufactured by Waters Co. was used, and as a column and a standard substance for measuring a molecular weight (in terms of polystyrene molecular weight) of the sample, a trademark of SHODEX PACKED COLUMN A-80M manufactured by Showa Denko K.K., and polystyrene having a molecular weight of 68–8,400,000manufactured by Tosoh Corporation were used, respectively.

5. Intrinsic Viscosity [η] (dl/g)

300 Milligrams of a sample was dissolved in 100 ml of tetralin to obtain a solution having a concentration of 3 mg/ml, the solution was diluted to obtain respective ½-, ⅓- and ⅕-time dilute solutions, viscosity of each dilute solution was measured three times at 135±0.1° C., using Ubbellohde viscometer, and an average of the values obtained was found.

6. Tensile Strength (TS) and Elongation at Break (EB)

Measured at a tensile rate of 200 mm/min. using a test piece having a shape according to dumbbell No.3 described in JIS K6251.

7. Hardness

Measured using Durometer Type A according to JIS K6253.

8. Heat Resistance

In compliance with a normal oven method according to JIS K6257, a sheet of a thickness of 1 mm obtained by press-molding a sample was heated at 110° C. for 100 hours to judge heat resistance. At this moment, the hanging sheet was hold as not to contact with each other and touch with a wall inside of the vessel of the test machine. The heat resistance was judged on the basis of the following criteria.

◯: The sheet was not deformed.

X: The sheet was deformed or melted.

9. Extruded Surface and Die Swell Ratio

A sample was subjected to extrusion under conditions of a barrel temperature of 190° C., a capillary diameter of 2.095 mm, a capillary length of 8 mm and a shear rate of 132 sec$^{-1}$ according to JIS K7199, whereby the extruded surface was judged, and the die swell ratio (diameter of extrudate/diameter of capillary) was found. The extruded surface was judged on the basis of the following criteria.

◯: The extruded surface was smooth.

Δ: The extruded surface was slightly rough.

X: The extruded surface was not smooth, but rough.

Reference Example 1

Using hexane as a solvent for polymerization and for coordinating a polymerization catalyst, ethylene, propylene and 1-butene were subjected to copolymerization under conditions of 50° C. and 0.8 MPa, thereby obtaining an ethylene-propylene-1-butene copolymer (hereinafter referred to as "component (B-1)"). As the polymerization catalyst, (1) triisobutylaluminum, (2) N,N-dimethylaniliniumtetraxis (pentafluoro) phenyl borate and (3) dimethylsilyl (tetramethylcyclopentadienyl) (3-tert-butyl-5-methyl-2-phenoxy) titanium dichloride were used in a molar ratio of (1):(2):(3)=633:28:1.

As a result of analysis based on an infrared absorbance ratio, the component (B-1) was confirmed to have an ethylene unit, a propylene unit and a 1-butene unit. Characteristics of the component (B-1) are as shown in Table 3. With respect to the above-mentioned monomer units, the ethylene unit, propylene unit and 1-butene unit were confirmed from the absorption of 720 cm$^{-1}$ (methylene rocking vibration), 1154 cm$^{-1}$ (methyl group rocking vibration owing to methyl branching) and 770 cm$^{-1}$ (methyl group rocking vibration owing to ethyl branching), respectively.

Reference Example 2

Using hexane and toluene as a solvent for polymerization and a solvent for coordinating a polymerization catalyst, respectively, ethylene, propylene and 1-butene were subjected to copolymerization at 46° C., thereby obtaining an ethylene-propylene-1-butene copolymer (hereinafter referred to as "component (B-2)"). As the polymerization catalyst, (1) triisobutylaluminum, (2) triphenylmethyltetrakis (pentafluorophenyl) borate and (3) dimethylsilyl (tetramethylcyclopentadienyl)(3-tert-butyl-5-methyl-2-phenoxy)titanium dichloride were used in a molar ratio of (1):(2):(3)=477:28:1.

Like in Reference Example 1, the component (B-2) was confirmed to have an ethylene unit, a propylene unit and a 1-butene unit. Characteristics of the component (B-2) are as shown in Table 3.

Examples 1 to 8 and Comparative Examples 1 and 2

Respective components in each containing ratio (parts by weight) as shown in Tables 4 and 5 were kneaded at 200° C. for 2 minutes using a kneading machine, a trademark of Plasti-Corder PLV type 151 manufactured by Brabender OGH (screw revolution 10 rpm), and further kneaded at 100 rpm for 5 minutes, thereby obtaining each thermoplastic resin composition. Characteristics of the thermoplastic resin compositions are as shown in Tables 4 and 5.

The results of Tables 4 and S demonstrate as follows.
 (1) The thermoplastic resin compositions in accordance with the present invention (Examples 1 to 8) are superior in their flexibility, heat resistance and moldability (extrusion processability).
 (2) That of Comparative Example 1 obtained using PP in place of the component (A) has a small die swell ratio (inferior moldability).
 (3) That of Comparative Example 2 obtained using EP in place of the component (B) is inferior in its heat resistance and extruded surface.

TABLE 1

|  | Component (A-1) | Component (A-2) | Component (A-3) | Component (A-4) |
|---|---|---|---|---|
| MFR (230° C., 2.16 kg) (g/10 min.) | 5.6 | 7.2 | 3.2 | 12.2 |
| Die swell ratio | 1.94 | 1.80 | 2.33 | 3.46 |

TABLE 2

|  | PP |
|---|---|
| Flexural modulus (Sa)(MPa) | 1380 |
| MFR (230° C., 2.16 kg)(g/10 min.) | 14.0 |
| Melting point of crystal(° C.) | 160.1 |
| Die swell ratio | 1.25 |

TABLE 3

|  | Component (B-1) | Component (B-2) |
|---|---|---|
| Intrinsic viscosity [η](dl/g) | — | 1.4 |
| Mw/Mn | 2.2 | 2.1 |
| Melting point of crystal (° C.) | Non-detected | Non-detected |
| Calorie for crystal melting (mj/mg) | Non-detected | Non-detected |
| Crystallization temperature (° C.) | Non-detected | Non-detected |
| Crystallization calorie (mj/mg) | Non-detected | Non-detected |
| Ta (wt %) | 50 | 50 |
| Ua (MPa) | 158 | 189 |
| $1.5 \times Sa \times Ta/100)^{3.3}$ (MPa) | 210 | 210 |

TABLE 4

|  | Example 1 | Example 2 | Example 3 | Example 4 | Comparative Example 1 |
|---|---|---|---|---|---|
| Components | — | — | — | — | — |
| (A-1) | 25 | — | — | — | — |
| (A-2) | — | 25 | — | — | — |
| (A-3) | — | — | 25 | — | — |
| (A-4) | — | — | — | 25 | — |
| PP | — | — | — | — | 25 |
| (B-1) | 75 | 75 | 75 | 75 | 75 |
| Antioxidant | 0.25 | 0.25 | 0.25 | 0.25 | 0.25 |
| Characteristics of Resin composition |  |  |  |  |  |
| MFR (230° C., 2.16 kg) (g/10 min.) | 6.7 | 7.0 | 6.1 | 7.5 | 7.1 |
| TB (MPa) | 2.9 | 2.7 | 2.9 | 2.8 | 8.0 |
| EB (%) | 1250 | 1220 | 955 | 1325 | 1370 |
| Hardness (Durometer A) | 76 | 75 | 75 | 75 | 75 |
| Heat resistance | ◯ | ◯ | ◯ | ◯ | ◯ |
| Extruded surface | ◯ | ◯ | ◯ | ◯ | ◯ |
| Die swell ratio | 1.36 | 1.20 | 1.83 | 1.42 | 0.91 |

TABLE 5

|  | Example 5 | Example 6 | Example 7 | Example 8 | Comparative Example 2 |
|---|---|---|---|---|---|
| Components | — | — | — | — | — |
| (A-3) | 12.5 | — | 8.5 | 4 | — |
| (A-4) | — | 12.5 | — | — | 12.5 |
| (B-1) | 37.5 | — | — | — | — |
| (B-2) | — | 37.5 | 41.5 | 46 | — |
| EP | — | — | — | — | 37.5 |
| (C-1) | 50 | 50 | 50 | 50 | 50 |
| Antioxidant | 0.25 | 0.25 | 0.25 | 0.25 | 0.25 |
| Characteristics of Resin composition |  |  |  |  |  |
| MFR (230° C., 2.16 kg) (g/10 min.) | 2.8 | 2.7 | 2.9 | 3.0 | 1.4 |
| TB (MPa) | 8.2 | 3.7 | 6.3 | 4.0 | 16.0 |
| EB (%) | 535 | 505 | 540 | 795 | 650 |
| Hardness (Durometer A) | 80 | 74 | 70 | 63 | 74 |
| Heat resistance | ○ | ○ | ○ | ○ | X |
| Extruded surface | ○ | Δ | ○ | ○ | X |
| Die swell ratio | 1.80 | 1.60 | 1.77 | 1.56 | — |

What is claimed is:

1. A thermoplastic resin composition comprising:
   (A) 5 to 95% by weight of a thermoplastic resin having a melt flow rate of from 0.001 to 100 g/10 min. measured at a temperature of 230° C. under a load of 2.16 kg and a die swell ratio of not less than 1,7, wherein the thermoplastic resin comprises a polyolefin resin, and
   (B) 95 to 5% by weight of an olefin polymer comprising an ethylene unit and an α-olefin unit of 3 to 20 carbon atoms, and satisfying the following formula (1), $$Ua \leq 1,5 \times Sa \times (Ta/100)^{3.3} \quad (1)$$

wherein:
   (i) Ua is a flexural modulus (MPa) of a resin composition for evaluation measured according to JIS K7203, which composition is composed of 50 parts by weight of said olefin polymer and 50 parts by weight of a homopolypropylene resin having a flexural modulus (Sa) of 1400±100 MPa measured according to JIS K7203, a melt flow rate of 12±3 g/10 min. measured at a temperature of 230° C. under a load of 2.16 kg and a peak position (melting point) on crystal melting of 162±2° C. measured by a differential scanning calorimeter (DSC) according to JIS K7122,
   (ii) Sa is a flexural modulus (MPa) of said homopolypropylene resin measured according to JIS K7203, and
   (iii) Ta is a containing ratio (50% by weight) of said homopolypropylene resin in the resin composition for evaluation, provided that the sum of the component (A) and the component (B) is 100% by weight,
   and wherein the olefin polymer comprises a non-crystalline olefin polymer showing neither a peak of not less than 1 J/g on crystal melting nor a peak of not less than 1 J/g on crystallization, when measured with a differential scanning calorimeter (DSC) according to JIS K7122.

2. The thermoplastic resin composition according to claim 1, wherein the thermoplastic resin comprises a polypropylene resin.

3. The thermoplastic resin composition according to claim 1, wherein the die swell ratio of the thermoplastic resin is not less than 2.0.

4. The thermoplastic resin composition according to claim 1, wherein the olefin polymer has a molecular weight distribution (Mw/Mn) of not more than 5 measured by gel permeation chromatography (GPC).

5. The thermoplastic resin composition according to claim 1, wherein the olefin polymer has an intrinsic viscosity [η] of from 0.3 to 10.0 (135° C., tetralin solution).

6. The thermoplastic resin composition according to claim 1, wherein the olefin polymer comprises at least two olefin units selected from the group consisting of ethylene unit, propylene unit and α-olefin unit having 4 to 20 carbon atoms with the proviso that a total carbon atom of the selected olefin units is not less than 6, and the olefin polymer satisfies the following formula (5), $$[y/(x+y)] \geq 0.30 \quad (5)$$

wherein x is an ethylene unit content (mol %) in the olefin polymer and y is a content (mol %) of the α-olefin unit having 4 to 20 carbon atoms in the olefin polymer.

7. The thermoplastic resin composition according to claim 1, wherein the composition comprises the following Component (C) and/or Component (D) in addition to Components (A) and (B) in an amount of from 0.1 to 200 parts by weight based on 100 parts by weight of the sum of Component (A) and Component (B), Component (C); a polymer, which comprises an ethylene unit and an α-olefin unit of 3 to 20 carbon atoms and satisfies the following formula (8), $$[y'/(x'+y')] < 0.30 \quad (8)$$

wherein x' is an ethylene unit content (mol %) in Component (C) and y' is a content (mol %) of the α-olefin unit of 4 to 20 carbon atoms in Component (C), and Component (D): the following Component (D-1) and/or Component (D-2), Component (D-1): a block copolymer composed of a polymer block mainly comprising a vinyl aromatic compound unit and a polymer block mainly comprising a conjugated diene unit, and Component (D-2): a hydrogenated product of Component (D-1).

* * * * *